(12) United States Patent
Mantey et al.

(10) Patent No.: US 7,039,736 B2
(45) Date of Patent: May 2, 2006

(54) SYSTEMS AND METHODS FOR ACCESSING BUS-MASTERED SYSTEM RESOURCES

(75) Inventors: Paul J. Mantey, Fort Collins, CO (US); Mike J. Erickson, Loveland, CO (US); David R. Maciorowski, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 10/342,886

(22) Filed: Jan. 15, 2003

(65) Prior Publication Data

US 2004/0139259 A1    Jul. 15, 2004

(51) Int. Cl.
| G06F 13/36 | (2006.01) |
| G06F 13/368 | (2006.01) |
| G06F 12/00 | (2006.01) |
| G06F 13/00 | (2006.01) |
| G06F 11/00 | (2006.01) |

(52) U.S. Cl. .................. 710/113; 710/119; 710/240; 710/241; 710/242; 710/243; 710/316; 710/317; 370/217; 370/221; 370/225

(58) Field of Classification Search .............. 710/113, 710/119, 240–243, 316–317; 370/217, 221, 370/225
See application file for complete search history.

(56) References Cited

U.S. PATENT DOCUMENTS

| 4,009,348 A | * | 2/1977 | Tate ........................... 370/221 |
| 5,222,223 A | * | 6/1993 | Webb et al. ................. 711/140 |
| 5,455,912 A | * | 10/1995 | Ludwig ....................... 710/113 |
| 5,603,049 A | * | 2/1997 | Balmer ........................ 710/113 |
| 5,604,878 A | * | 2/1997 | Colwell et al. .............. 712/217 |
| 6,046,982 A | * | 4/2000 | Ozveren et al. ............ 370/232 |
| 6,098,137 A | * | 8/2000 | Goodrum et al. ........... 710/311 |
| 6,105,154 A | * | 8/2000 | Wang et al. ................. 714/732 |
| 6,430,679 B1 | * | 8/2002 | Heeb ........................... 712/218 |
| 6,892,266 B1 | * | 5/2005 | Reimer et al. .............. 710/305 |
| 2001/0028657 A1 | * | 10/2001 | Brewer et al. .............. 370/406 |
| 2003/0172310 A1 | * | 9/2003 | Moyer et al. ............... 713/300 |
| 2004/0196859 A1 | * | 10/2004 | Benner ........................ 370/413 |
| 2005/0086441 A1 | * | 4/2005 | Meyer et al. ............... 711/158 |
| 2005/0102456 A1 | * | 5/2005 | Kang .......................... 710/113 |
| 2005/0216677 A1 | * | 9/2005 | Jeddeloh et al. ............ 711/150 |

OTHER PUBLICATIONS

Taub, D.M., "Corrected Settling Time of the Distributed Parallel Arbiter," Jul. 1992, IEEE Proceedings of Computers and Digita Techniques, vol. 139, Issue 4, p. 348-354.*

* cited by examiner

*Primary Examiner*—Rehana Perveen
*Assistant Examiner*—Faisal Zaman (57) ABSTRACT

Disclosed are systems and methods for providing access to bus-mastered system resources comprising disposing a bus multiplexer between a first bus and a bus access arbiter, wherein the first bus is coupled to at least one system resource for which bus access is arbitrated by the bus access arbiter, and controlling the bus multiplexer to couple a second bus to the first bus thereby providing a link between the first bus and the second bus bypassing the bus access arbiter.

21 Claims, 3 Drawing Sheets

SYSTEMS AND METHODS FOR ACCESSING BUS-MASTERED SYSTEM RESOURCES

FIELD OF THE INVENTION

The present invention relates generally to computer systems and, more particularly, to accessing bus-mastered system resources.

DESCRIPTION OF RELATED ART

Computer systems have become increasingly complex throughout the years, often including various subsystems to provide desired operability and/or manageability. For example, a server system today may comprise a system processing unit (SPU) or units operating on a UNIX, WINDOWS, or LINUX environment, and running applications such as databases, web applications, etcetera. Such a server system may further comprise a manageability subsystem that is maintaining and updating the state and status of the system devices and/or functional aspects (hereinafter collectively referred to as system resources), e.g., flash read only memory (ROM), random access memory (RAM), non-volatile RAM, universal asynchronous receiver/transmitter (UART), and other resources. For example, the manageability subsystem may be responsible for keeping firmware up to date on reprogrammable images, keeping field programmable gate arrays (FPGAs) up to date with reprogrammable images, reporting configuration information, and otherwise maintaining the integrity of the server. Although both the SPU and the manageability subsystem co-exist, the resulting system is essentially two systems within a system.

Often, in order to provide desired operation and predictability with respect to control and access to system resources, sharing of system resources may be controlled by an arbiter, such as may be part of a "bus-master" configuration. However, buses that are controlled by a single bus-master provide several challenges. Although such bus-mastered buses are typically easier to control because they have a single master, if that one bus-master were to be disabled (such as because it is held in reset or it has failed), full access to the system resources behind the bus-master is no longer available. For example, the manageability subsystem could not discover or update the state of the system resources behind the bus-master.

Although one may desire to update system resources in order to discover the state of the devices, in order to gain a better understanding of the failure mechanism that caused the bus-master to fail, or to perform a firmware upgrade, these bus-mastered system resources are only accessible when the system is up and functioning, at least to a point where the system is powered, the clocks are running, and some level of basic input/output system (BIOS) code is executable. Present systems and methods do not provide access to bus-mastered system resources whose bus-master is inoperable, which includes not only those times during which the bus-master has experienced a failure but also includes those times during which the host system is not in at least a minimal operational state.

BRIEF SUMMARY OF THE INVENTION

An embodiment of the invention provides a method for providing access to bus-mastered system resources comprising disposing a bus multiplexer between a first bus and a bus access arbiter, wherein the first bus is coupled to at least one system resource for which bus access is arbitrated by the bus access arbiter, and controlling the bus multiplexer to couple a second bus to the first bus thereby providing a link between the first bus and the second bus bypassing the bus access arbiter.

A further embodiment of the invention provides a system for providing access to bus-mastered system resources comprising means for disposing a bus multiplexer between a first bus and a bus access arbiter, wherein the first bus is coupled to at least one system resource for which bus access is arbitrated by the bus access arbiter, and means for controlling the bus multiplexer to couple a second bus to the first bus thereby providing a link between the first bus and the second bus bypassing the bus access arbiter.

A still further embodiment of the invention provides a system providing access to bus-mastered system resources comprising a bus access arbiter providing bus-mastering control with respect to at least one system bus, a first bus coupled to a plurality of system resources, the at least one system bus comprising the first bus, wherein the bus access arbiter provides arbitrated access to the plurality of system resources when providing bus-mastering of the first bus, a second bus coupled to the bus access arbiter, and a bus multiplexer coupled to the first bus and the second bus and operable to selectively provide communication between the first bus and the second bus bypassing the bus access arbiter.

DETAILED DESCRIPTION

Embodiments of the present invention provide systems and methods which take a bus-mastered bus, such as a bus for which the bus-master is inoperable, and make that bus available to a device that is awake and operational, such as may be disposed upon a second bus. In providing accessibility to an otherwise inaccessible or otherwise unavailable bus according to embodiments of the present invention, two bus models which are consistent in their electrical operation and in their basic functionality are bridged or multiplexed, such as to bypass an inoperable bus-master. The present invention is being very careful and guarded with respect to when such multiplexing is actually performed so that bus cycles already in process and/or other bus activity is not detrimentally affected. Specifically, embodiments of the present invention operate to control bus multiplex switching synchronously with the activities that are currently in process in the system.

Figure 1:
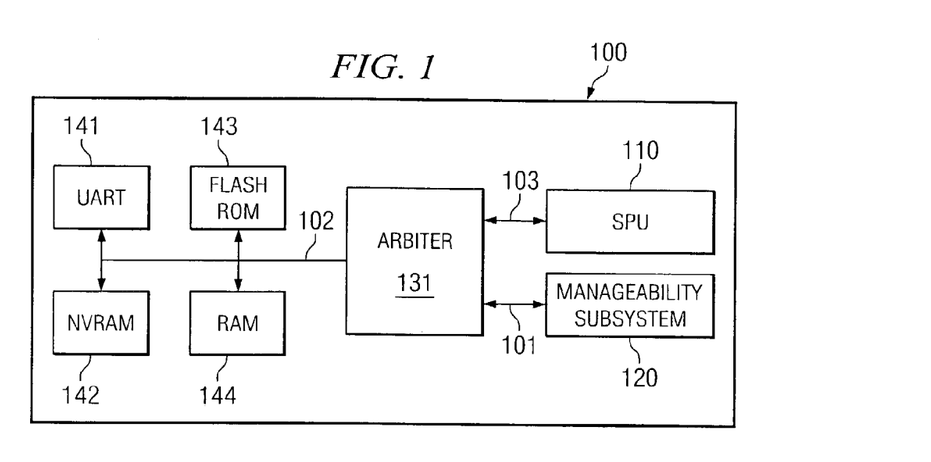
FIG. 1 shows a high level block diagram of a system having a bus-mastered bus as may be controlled according to embodiments of the present invention.

Directing attention to FIG. 1, a high level block diagram of system 100, such as may comprise a multi-way server system or other computerized system, is shown. System 100 includes SPU 110, such as may comprise a central processing unit (CPU), for example the Hewlett Packard PA-8500 or Intel PENTIUM family of processors, operating on a UNIX, WINDOWS, or LINUX environment, and running applications such as databases, web applications, etcetera, for which system 100 is deployed. System 100 further includes manageability subsystem 120, such as may comprise a CPU or micro controller, for example the Samsung ARM family of processors, and supporting circuitry, such as ROM, RAM, and program code, suitable for providing firmware updates, updating FPGAs, reporting configuration information, and otherwise maintaining the integrity of system 100.

As shown in FIG. 1, both SPU 110 and manageability subsystem 120 are coupled to various system resources, here shown as UART 141, non-volatile RAM 142, flash ROM 143, and RAM 144, via bus 101, bus 102, and bus 103, wherein bus 102 is controlled by a bus-master apparatus. According to the embodiment of FIG. 1, bus 101 provides manageability processors with access to system resources (e.g., ROM, RAM, NVRAM, etcetera) via arbiter 131. Similarly, bus 103 provides system processors with access to system resources via arbiter 131. Bus 102 of the illustrated embodiment provides a system resource bus mastered by arbiter 131.

Buses 101 and 103 may each comprise an asynchronous bus providing clocked access to address spaces of the various system resources, such as may comprise a microprocessor external bus. Accordingly, although not shown in order to simplify the drawing for understanding the present invention, buses 101 and 103 may provide connections to one or more of system resources 141–144, although not providing the same level of connectability thereto provided by bus 102. Bus 102 may comprise a processor dependent hardware (PDH) bus providing bus-mastered access to various hardware dependent aspects of the various system resources, such as to enable monitoring states, accessing control code, accessing processor dependent address space, and/or the like.

In operation, bus 102 provides controlled access with respect to aspects of system resources 141–144, such as to SPU 110 and manageability subsystem 120. For example bus 102 may be mastered by a bus-bridge which is connected through a high speed protocol to a processor interface agent. Processor code fetches may be routed through this agent to the bus-bridge to the system resources. The bus-bridge device may comprise a core module inside of a FPGA, such as a bus-master circuit comprising arbiter 131. The bus-bridge device may further comprise a micro-controller bus interface to manageability subsystem 120 that may be responsible for maintaining the state of system 100 as well as performing updates to system firmware. Arbiter 131 may determine whether SPU 110 or manageability subsystem 120 has access to bus 102.

In a typical configuration, SPU 110, arbiter 131 and the system resources on bus 102 are powered off of system power. During powered operation, SPU 110 communicates with system resources on bus 102 by requesting the bus from arbiter 131. If arbiter 131 determines that the bus is free, (e.g., a processor of manageability subsystem 120 is not currently conducting a transaction using bus 102) then arbiter 131 grants permission to SPU 110 to master a transaction on bus 102. SPU 110 will "own" bus 102 until it finishes its transaction. Once the transaction is completed, arbiter 131 will de-assert the bus grant to SPU 110, freeing up bus 102.

Likewise, if a processor of manageability subsystem 120 wishes to communicate with system resources on bus 102, it sends a request to arbiter 131. Arbiter 131 will determine whether bus 102 is free, (e.g., SPU 110 is not currently conducting a transaction using bus 102), then arbiter 131 will grant permission to the processor of manageability subsystem 120 to master a transaction on bus 102. The manageability subsystem processor will "own" bus 102 until it finishes its transaction. Once the transaction is completed, arbiter 131 will de-assert the bus grant to the manageability subsystem processor, freeing up bus 102.

It should be appreciated that, although the above bus-mastering technique works well when system 100 is powered up and running, when system 100 is shut down (e.g., in standby-mode) the system resources of bus 102 and arbiter 131 are powered down. Therefore, manageability subsystem 120 cannot access the system resources of bus 102 when system 100 is shut down.

For system diagnosis, fault recovery, system manageability, and/or like reasons it may be desirable to have access to bus-mastered system resources at a time the system itself is not fully functional, such as at any time after the manageability subsystem is itself available. For example, manageability subsystem 120 may be operational substantially immediately after the power cords are connected to AC power or standby power is otherwise enabled, when operation of SPU 110 and/or arbiter 131 are not. Accordingly, although manageability subsystem 120 may be operational, if it were desired to execute a firmware update, or to take an inventory of the system resources and/or their status at such a time, the system resources behind arbiter 131 would not be available for such functionality in system 100.

Embodiments of the present invention provide the aforementioned access to bus-mastered system resources during times of system reset, system power-up, system power-down, and/or system failure. Such access may be provided using a number of techniques. As discussed above, bus 102 is behind arbiter 131, and arbiter 131 is only operational during times when the system clocks etcetera are up and running, i.e., when SPU 110 is actually functioning to at least some minimum level. One technique for providing the desired access to bus 120 might be to implement spoofing, e.g., to feed arbiter 131 a clock that is operable to facilitate operation of arbiter 131. However, implementation of such a spoofing clock may itself introduce problems, such as problems associated with the spoofing clock being a different frequency than the system clock and uncertainty with respect to the behavior spoofing might induce with respect to the unpowered parts of the system.

Figure 2:
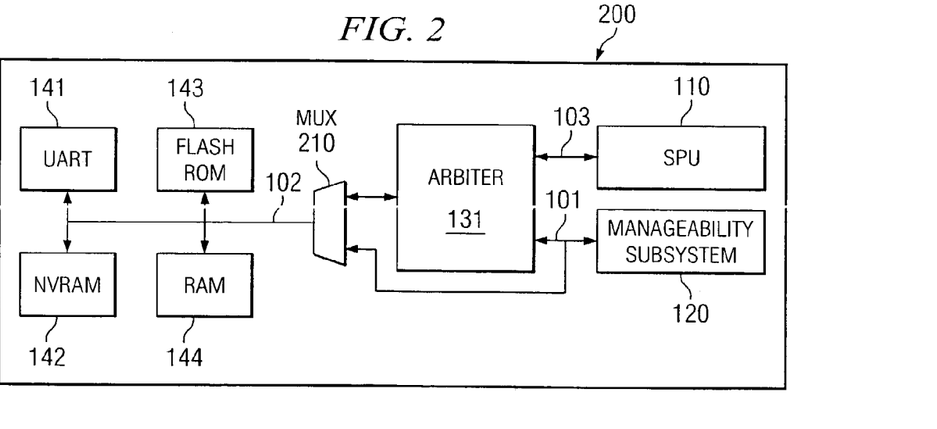
FIG. 2 shows a high level block diagram of implementation of one embodiment of the present invention.

Directing attention to FIG. 2, implementation of one embodiment of the present invention is shown with respect to system 200, such as may comprise a multi-way server or other computer system. In the embodiment of FIG. 2, bus 102 is preferably powered throughout the life of system 100, such as during system standby-mode etcetera. For example, bus 102 may be implemented as a FPGA, or portion thereof, which is powered as long as system 200 is connected to a power source.

In the embodiment of FIG. 2, multiplexer (MUX) 210 has been disposed in bus 102 and coupled to bus 101. In operation according to one embodiment, MUX 210 in a "normal" operational state (system powered-mode) leaves bus 102 coupled therethrough such that arbiter 131 remains in control of bus 102. However, according to embodiments of the invention, MUX 210 in a management operational state (system standby-mode) breaks the connection between bus 102 and arbiter 131 and couples bus 101 to system resources 141–144 through bus 102, thereby providing a configuration in which arbiter 131, the device that normally arbitrates bus 102, is bypassed.

In the event that bus-mastering circuitry, such as arbiter 131, fails, or has been held in reset, it is possible, via MUX 210, for manageability subsystem 120 to gain access to bus 102. According to one embodiment, a control signal is provided to MUX 210, such as by manageability subsystem 120 or other programmed input/output (I/O), to configure MUX 210 so that bus 102 is directly connected to bus 101. When coupled directly to bus 101 by MUX 210, bus 102 preferably occupies the same address space as arbiter 131, or a portion thereof, would otherwise occupy. According to embodiments of the present invention, manageability subsystem 120 holds bus-master circuitry or portions thereof, such as arbiter 131, in a reset state to ensure that system 200 will not come out of reset and attempt to fetch code during update or status checking operations by manageability subsystem 120.

It should be appreciated that, when directly coupled to bus 101, the illustrated embodiment does not provide a multi-master implementation of bus 102 because MUX 210 assures that the system resources coupled to bus 102 "see" only one master. However, MUX 210 of the illustrated embodiment provides for a plurality of operational modes, including one in which arbiter 131 is coupled to bus 102 for providing bus-mastering thereof.

The policy used by a processor in accessing the system resources on bus 102 changes when the system is in a powered-up state, versus when the system is not in a powered-up state, e.g., the system is in a standby state. For example, a first policy, operable when SPU 110 is not powered-up, provides for access to the resources of bus 102 exclusively by a processor of manageability subsystem 120. However, a second policy, operable when SPU 110 is powered-up, provides for complete access by both SPU 110 and manageability subsystem 120 to the resources of bus 102 through arbiter 131 without contention. According to embodiments of the invention, although the arbitration policy may change as described above, the devices on bus 102 remain at their same address locations, thereby allowing manageability subsystem 120 to readily access the system resources according to either policy.

Operating according to a preferred embodiment, in powered-mode (e.g., when SPU 110 is powered up) system 200 operates as described above with respect to FIG. 1. That is, MUX 210 is preferably set so that the output of arbiter 131 is directly tied to bus 102. However, in standby-mode (e.g., when SPU 110 is not powered up) MUX 210 is preferably set so that bus 101 is directly connected to bus 102, bypassing arbiter 131. As will be described in further detail below with reference to FIG. 3, there is preferably a control and feedback mechanism to/from MUX 210 that allows manageability subsystem 120 to control the setting of MUX 210. According to embodiments of the present invention, manageability subsystem 120 determines when system 200 may be powered up, and therefore safely controls the setting of MUX 210 to "give back" bus 102 to arbiter 131 just prior to powering up system 200. Preferably, manageability subsystem 210 monitors the health of the powered system (e.g., the clock utilized by arbiter 131). For example, a signal available to the manageability subsystem may indicate that the arbiter clock is healthy, and that therefore, bus 102 can be safely accessed via the arbiter.

Feedback mechanisms, such as that described above, are implemented according to preferred embodiments in order to prevent undesired system operation, such as processor "lock-ups" etcetera. For example, if feedback were not available a scenario in which a processor of manageability subsystem 120 finishes a last "unpowered" transaction on bus 102, the manageability subsystem processor switches MUX 210 to "give" ownership of bus 102 back to arbiter 131, the processor of manageability subsystem 120 starts a system power-up sequence, system 200 fails to power-up properly, a processor of manageability subsystem 120 (unaware that system 200 has improperly powered up) sends a bus request to arbiter 131, and since arbiter 131 is not functioning, the bus grant will never come back and the processor of manageability subsystem 120 is now "hung". Feedback mechanisms of embodiments of the present invention may be implemented to prevent such results from occurring. For example, if the processor of manageability subsystem 120 does not receive an "arbiter okay" message within an expected amount of time, then manageability subsystem 120 may switch MUX 210 back to the unpowered-mode (giving ownership of bus 102 back to manageability subsystem 120).

Figure 3:
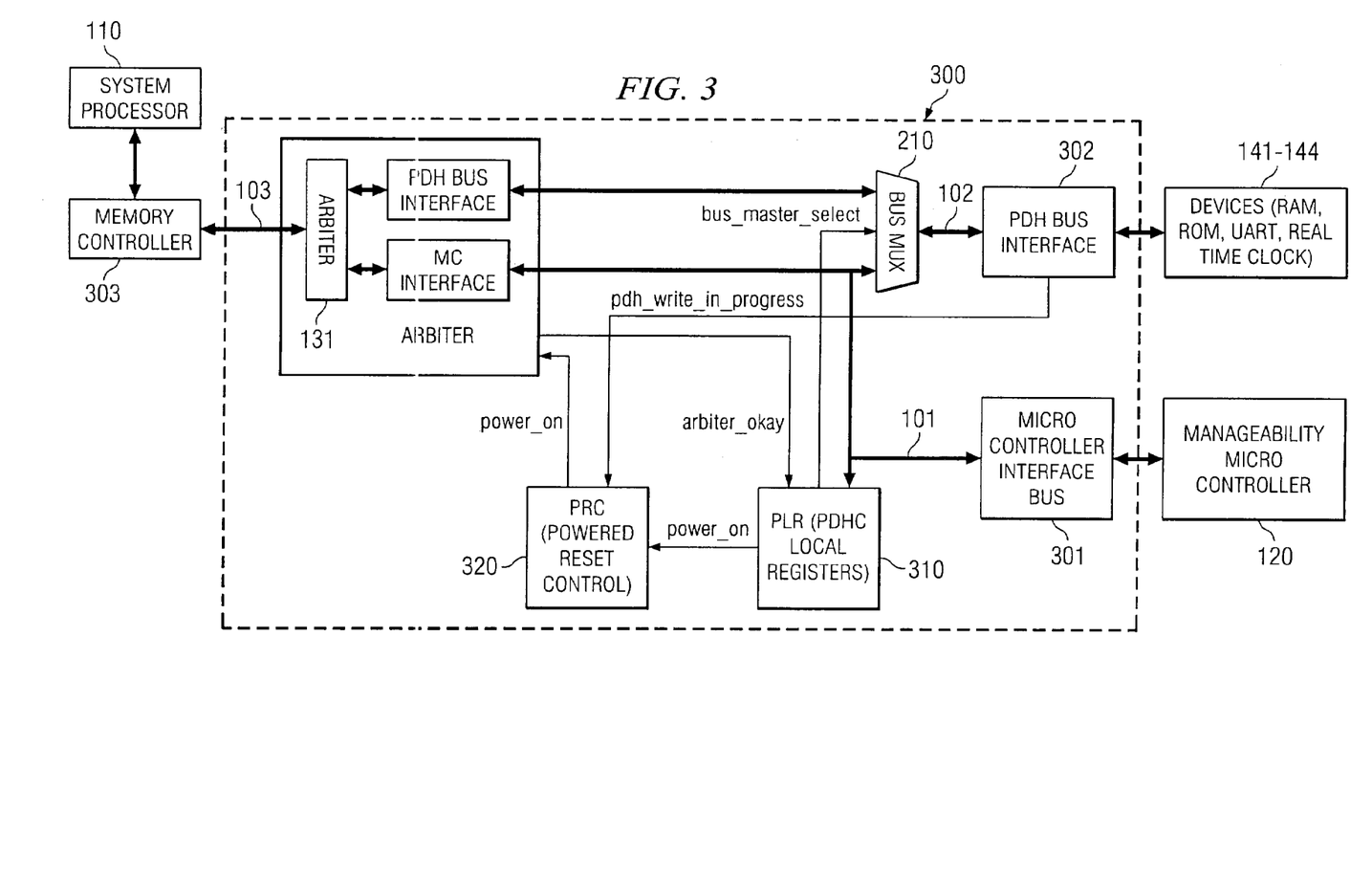
FIG. 3 shows detail with respect to disposing a bus multiplexer in a bus-mastered bus according to an embodiment of the present invention.

Directing attention to FIG. 3, further detail with respect to disposing a bus multiplexer in a bus-mastered bus is shown according to an embodiment of the present invention. FIG. 3 shows block 300, such as may comprise a FPGA, which may form a part of system 200 of FIG. 2. Block 300 may provide a number of devices that are typically implemented separately in application specific integrated circuits (ASICs), programmable logic arrays (PLAs), FPGAs, and/or the like consolidated into a single block. Block 300 of the illustrated embodiment includes bus-master circuitry, e.g., arbiter 131, and an interface to system resources, e.g., PDH bus interface 302 such as may couple to system resources such as RAM, ROM, NVRAM, etcetera. Of course, there is no limitation to any particular aspects of the system being provided in the consolidated configuration or external thereto. Indeed, the use of a consolidated configuration as shown by block 300 of FIG. 3 may be omitted according to particular embodiments, if desired.

Also shown in FIG. 3 are SPU 110 and manageability subsystem 120, disposed externally to block 300 and coupled thereto. According to the illustrated embodiment, manageability subsystem 120 is coupled to bus 101 of FIG. 3 via an interface, such as via micro-controller interface bus 301. SPU 110 is coupled to bus 103 of FIG. 3 via a memory controller, such as via memory controller 303. Accordingly, block 300 may essentially provide a memory controller that has a number of processors and processor buses coupled thereto, and perhaps a cross-bar bus (not shown) coupled to other memory controllers in the system.

As discussed with reference to FIG. 2 above, the embodiment of FIG. 3 includes MUX 210 disposed between bus 102 and arbiter 131. Depending upon the control state of MUX 210, such as may be under control of a signal from PDH controller local registers (PLR) 310 of the illustrated embodiment, bus 102 may be coupled to and under control of arbiter 131 or coupled to bus 101 and under control of a manageability processor, such as that of manageability subsystem 120, coupled thereto. For example, during particular system states (system standby-mode states), such as during system power-up or standby power mode, MUX 210 routes bus 101 to bus 102 bypassing arbiter 131. However, during powered-up operation or other nominally operational states (system powered-mode states), MUX 210 may route bus 102 through arbiter 131, resulting in a system configuration substantially as that shown in FIG. 1. In this latter configuration, if a manageability processor is desirous of communicating with system resources via bus 102, the requests are arbitrated through arbiter 131 (e.g., both the processors of SPU 110 and of manageability subsystem 120 may be provided controlled access to the system resources via bus 102 under control of arbiter 131). In the former configuration, however, if a processor of manageability system 120 is desirous of communicating with system resources via bus 102, direct communication is provided by MUX 210.

Embodiments of the present invention carefully control switching of MUX 210 from standby-mode to powered-mode, such as to avoid changing the state of MUX 210 when there is any traffic in flight on bus 102. According to embodiments of the present invention, a microprocessor controls bus 102 in a system standby state. For example, embodiments of the present invention provide for control of the switching state of MUX 210 by a standby processor of manageability subsystem 120, such that when in a standby-mode MUX 210 is set in the aforementioned standby-mode state and when the standby processor is done with traffic on bus 102 it sets a register, such as within PLR 310, to place MUX 210 in a powered-mode state (see e.g., signal "bus_master_select" provided between PLR 310 and MUX 210). It should be appreciated that the standby processor would know that it is off of bus 102 (see e.g., signal "pdh_write_in_progress" provided between PDH bus interface 302 and power reset control (PRC) 320 and/or the standby processor has completed its transaction) and, thus, processes of the standby processor could change the state of MUX 210 as well as provide other system control, such as initiate a power-up reset sequence to bring the system up to a powered-up state, e.g., by fetching boot code etcetera.

According to the above-described embodiment, a standby processor preferably initiates the power-on reset sequence (see e.g., signal "power_on" provided between PLR 310 and PRC 320), such as upon completion of system manageability functions by manageability subsystem 120. Accordingly, the initiation of the power-on reset sequence may allocate bus 102 to arbiter 131 by switching of MUX 210 to a powered-mode state. For example, the standby processor may set a register in PLR 310 which in turn would control MUX 210 (e.g., using signal "bus_master_select").

To avoid issues with contention for the bus and/or system resources when MUX 210 is in a standby-mode state, embodiments of the present invention operate to control particular bus resources to prevent their accessing bus 102. For example, according to one embodiment of the invention, the standby processor holds arbiter 131 in a reset state to prevent its completing initialization and attempting to access system resources via bus 102 while bus 102 is under the control of manageability subsystem 120. Holding arbiter 131 in reset under control of manageability subsystem 120 may be accomplished in a number of ways, such as by a processor thereof providing a control signal to PLR 310 via bus 101 which in turn is accessed via bus 101 by arbiter 131. For example, signal "power_on" provided between PLK 310 and PRC 320 in combination with signal "pdh_write_in_progress" provided between PDH bus interface 302 and PRC 320 may be used to control signal "power_on" provided between PRC 320 and bus-mastering circuitry including arbiter 131 to hold arbiter 131 in a reset state.

Embodiments of the invention may further be adapted to provide synchronous switching of MUX 210 with respect to operations that are in progress on the system. For example, the present invention may operate to prevent switching of MUX 210 to the powered-mode state when bus resources, such as arbiter 131, are not functional (see e.g., signal "arbiter_okay" provided between bus-mastering circuitry and PLR 310. Similarly, embodiments of the present invention may operate to provide switching of MUX 210 to a standby-mode state when a malfunction is detected, such as the reset sequence is initiated but for some reason (e.g., due to a power failure or a clock failure) the sequence fails.

As an example of synchronous switching of MUX 210, if a switch of MUX 210 is made from the standby-mode state to the powered-mode state during initialization of particular resources, without knowledge of the state of the initialization, the bus may become frozen (i.e., the bus may become hung) because a transaction never completes. For example, arbiter 131 may not be fully initialized, such as due to a clock failure or other load error, thereby effectively isolating bus 102 from the system and perhaps causing manageability subsystem processors etcetera to hang during a subsequent initialization sequence when there is no stimulus on bus 102. Accordingly, embodiments of the present invention provide a feedback signal (e.g., "arbiter-okay") from bus-master circuitry, such as arbiter 131, to indicate when the bus-master has successfully powered up and the bus is clear, thereby avoiding a case of the initiation sequence trying to negotiate for a resource that does not exist and losing the bus. This feedback signal may be provided via bus 101 to PLR 310 for use according to the present invention.

In operation according to one embodiment, when a switch-over of MUX 210 from a standby-mode state to a powered-mode state is initiated, an acknowledgement signal indicating that the switch-over of MUX 210 has been accomplished is provided. This acknowledgement signal may be provided via the link utilized for providing a control signal to MUX 210, e.g., the link between MUX 210 and PLR 310 in the embodiment of FIG. 3.

Embodiments of the invention utilize additional or alternative criteria, such as may be provided from sensing logic that determines that resources connected to bus 102 are currently up and operational, in concluding that a switch-over of MUX 210 is or can be properly accomplished. This criteria may be utilized to qualify the aforementioned acknowledgement such that a successful switch-over of MUX 210 includes not only manipulation of bus connections, but also that one or more bus resources is in a desired state. For example, criteria that may be provided may include a clock signal of arbiter 131 when it is desired to know that both MUX 210 has switched to a powered-mode state and that arbiter 131 is operational when concluding that a switch-over has been properly accomplished. Such additional criteria may be provided in a variety of ways, such as via bus 101 to PLR 310 with a processor of manageability subsystem 120 accessing the information from PLR 310.

It should be appreciated that, according to the embodiment described above, there may be a brief period of time (e.g., several hundred milliseconds) when bus 102 is not accessible during switch-over of MUX 210. Specifically, as manageability subsystem 120 controls MUX 210 to switch bus 102 over and give ownership to arbiter 131, but the arbiter is not up and functioning yet because it is still coming out of reset, bus 102 may be unavailable. However, once arbiter 131 has come successfully out of reset, and perhaps all of the circuitry that communicates with the arbiter is healthy, the aforementioned status signal may inform a processor of manageability subsystem 120 that bus 102 is now available again. Embodiments of the present invention may implement a timeout algorithm or the like to recognize that a malfunction has occurred when a proper status signal is not received from a switch-over of MUX 210.

Figure 4:
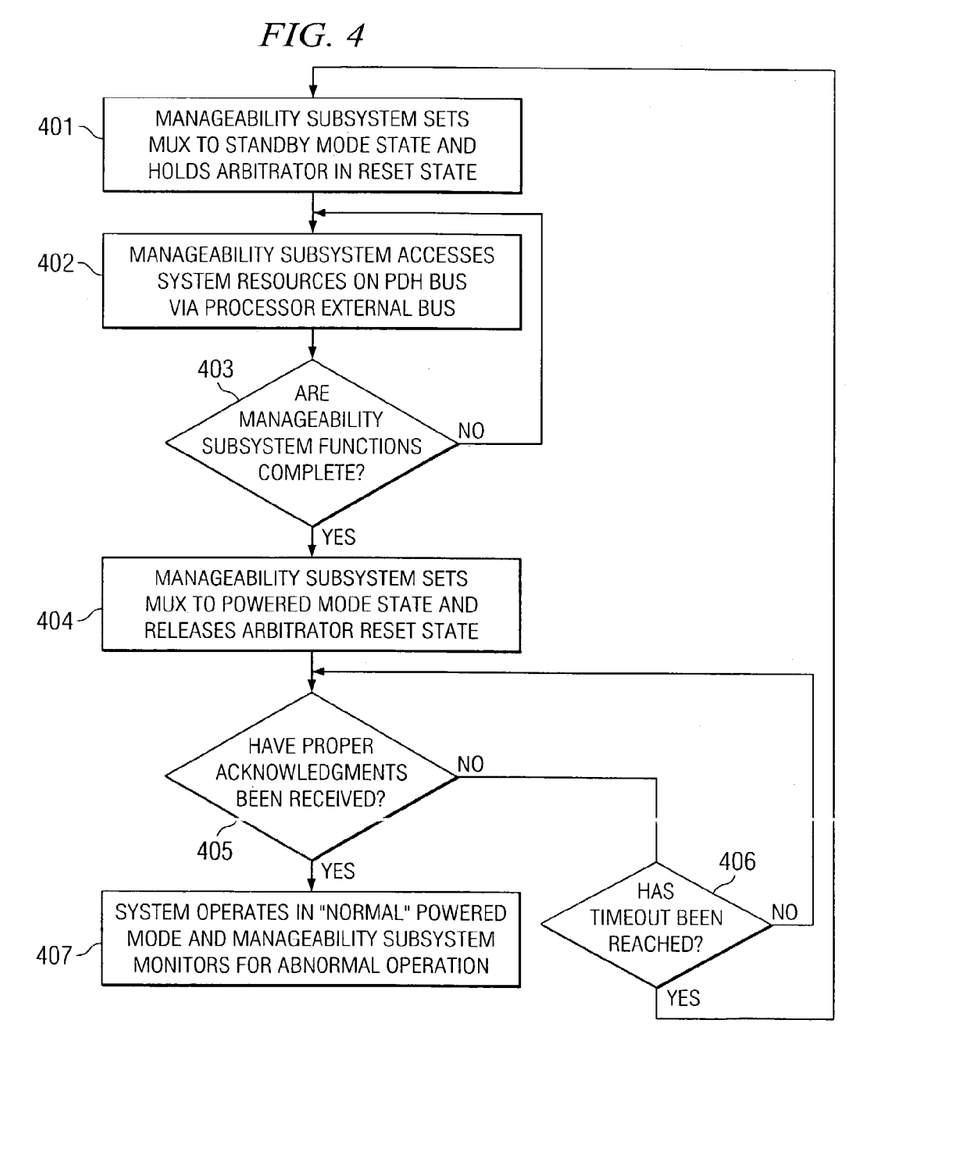
FIG. 4 shows a flow diagram of operation according to an embodiment of the present invention.

Directing attention to FIG. 4, a high level flow diagram of an embodiment providing operation as described above is shown. In the embodiment of FIG. 4, a manageability subsystem sets the bus MUX to a standby-mode state, thereby providing control of a PDH bus to a processor of the manageability subsystem, and holds a bus-master arbiter in a reset state at step 401. For example, step 401 may be invoked when AC power is supplied to the system, when the system is reset, when abnormal operation is detected, at the control of an operator, and/or the like.

At step 402 the manageability subsystem accesses system resources on the PDH bus via a processor external bus coupled to a processor of the manageability subsystem. Access of the system resources by the manageability subsystem may be to receive data therefrom, e.g., to obtain configuration information, current state information, and/or the like, and/or may be to transmit data thereto, e.g., to change configuration settings, update operating code, and/or the like. Such access to system resources by the manageability subsystem may comprise a plurality of functions and/or a plurality of separate system resources. Accordingly, multiple iterations of manageability subsystem access to system resources by step 402 may be invoked by step 403.

If at step 403 it is determined that manageability subsystem functions are complete, processing proceeds to step 404 wherein the manageability subsystem returns control of the PDH bus to the bus-master. Accordingly, the manageability subsystem of the illustrated embodiment sets the bus MUX to a powered-mode state and releases the bus-master arbiter reset state.

At step 405 it is determined if the proper acknowledgements are received in response to the change in state of the bus MUX. For example, both an acknowledgement from the bus MUX that a change in states thereof has been accomplished and an acknowledgement from the bus-master arbiter that the arbiter has completed initialization and resources coupled thereto are healthy may be expected by the manageability subsystem.

If the expected acknowledgement or acknowledgements are not received at step 405, step 406 determines if a timeout condition has been reached. If the timeout condition has not been reached, processing returns to step 405 for a redetermination as to whether the expected acknowledgment or acknowledgements have been received. If the timeout condition has been reached, further operation of the manageability subsystem may be desired in order to identify and/or rectify the source of the malfunction. Accordingly, processing may again return to step 401 from step 406.

However, if the expected acknowledgement or acknowledgements are received at step 405, processing may proceed to step 407 wherein the system operates in a "normal" powered-mode. It may be desirable to continuously or periodically determine if the powered-mode operates normally in order to identify and/or rectify sources of malfunction. Accordingly, step 407 of the illustrated embodiment further provides for the manageability subsystem monitoring for abnormal operation. If such abnormal operation is detected, processing might again return to step 401.

It should be appreciated that implementation of embodiments of the present invention may be particularly useful in a plurality of situations. In the past, if it was desired to update various flash resources, such as those that the boot ROM of the system processors, the system had to be booted up to a state where it was certain that the system processors were no longer fetching code via the bus-mastered bus. That is to say, the system would have to get clear of the boot process to where the system was running out of local memory before one could reliably and predictably access and update the flash resources.

However, when in an initial prototype development of a brand new processor or a brand new memory controller or some other piece of very large scale integration (VLSI), the chances of completing a boot process to a point where the processes are located on a memory are typically small. Accordingly, system engineers and technicians often spend a great deal of time and money in installing and removing ROMs and/or other flash resources to and from prototype systems for diagnosis and/or programming. For example, various ROMs may be physically removed from the system for placing in a ROM programmer for programming the ROMs on another computer. The investment of such time and money is aggravated by the fact that diagnosis of the cause of the aforementioned incomplete boot process is problematic, thereby often resulting in trial and error removal, testing, and/or reprogramming of flash resources.

Embodiments of the present invention, however, provide a system standby state wherein engineers and technicians can access various flash resources for data acquisition and/or updating, without the need for a boot cycle to complete. Accordingly, not only is time and money saved with respect to the removal and reprogramming of flash resources, but improved diagnostics are available as previously unavailable information with respect to system resources is made readily available.

It should be appreciated that implementation of embodiments of the present invention are useful with respect to systems other than the aforementioned prototype systems. For example, bus access provided according to the present invention may be utilized in production systems to provide identification and/or rectification with respect to sources of malfunction. For example, one or more system memory modules may "freeze" during otherwise normal operation of a particular system in which an I2C controller is available on a PDH bus. Embodiments of the present invention may operate to provide a manageability subsystem, or other processor based resource, access to the I2C controller in order to inventory the memory configurations of the system for diagnosis of the malfunction.

Analysis according to embodiments of the present invention might, for example, show whether, based upon the power requirements of the system, whether enough power is available to boot the system. Additionally or alternatively, embodiments may be utilized to report system configuration before resets are released.

What is claimed is:

1. A method for providing access to bus-mastered system resources, said method comprising:
   disposing a bus multiplexer between a first bus and a bus access arbiter, wherein said first bus is coupled to at least one system resource for which bus access is arbitrated by said bus access arbiter; and
   controlling said bus multiplexer to couple a second bus to said first bus thereby providing a link between said first bus and said second bus bypassing control of said bus multiplexer by said bus access arbiter.

2. The method of claim 1, further comprising:
   holding said bus access arbiter in a reset state when said second bus is coupled to said first bus bypassing said bus access arbiter.

3. The method of claim 1, further comprising:
   controlling said bus multiplexer to selectively alternate between said bus multiplexer coupling said second bus to said first bus bypassing said bus access arbiter and coupling said first bus to said bus access arbiter synchronously with activities that are currently in process in a host system thereof.

4. The method of claim 1, further comprising:
   controlling said bus multiplexer to couple said bus access arbiter to said first bus; and
   controlling said bus access arbiter to perform an initialization sequence.

5. The method of claim 4, further comprising:
monitoring for an acknowledgment that said bus multiplexer coupled said bus access arbiter to said first bus; and
monitoring for at least one criteria associated with performance of said bus access arbiter initialization sequence.

6. The method of claim 5, further comprising:
determining if said acknowledgement and said at least one criteria have been met within a timeout period; and
if said acknowledgement and said at least one criteria have not been met within a timeout period, controlling said bus multiplexer to couple said second bus to said first bus thereby providing a link between said first bus and said second bus bypassing said bus access arbiter.

7. The method of claim 1, further comprising:
accessing said at least one system resource by a manageability subsystem via said first and second bus.

8. The method of claim 7, wherein said accessing said at least one system resource by said manageability subsystem comprises obtaining configuration information with respect to said at least one system resource.

9. The method of claim 7, wherein said accessing said at least one system resource by said manageability subsystem comprises obtaining state information with respect to said at least one system resource.

10. The method of claim 7, wherein said accessing said at least one system resource by said manageability subsystem comprises updating information stored by said at least one system resource.

11. A system for providing access to bus-mastered system resources, said system comprising:
means for disposing a bus multiplexer between a first bus and a bus access arbiter, wherein said first bus is coupled to at least one system resource for which bus access is arbitrated by said bus access arbiter; and
means for controlling said bus multiplexer to couple a second bus to said first bus thereby providing a link between said first bus and said second bus bypassing control of said bus multiplexer by said bus access arbiter.

12. The system of claim 11, further comprising:
means for holding said bus access arbiter in a reset state when said second bus is coupled to said first bus bypassing said bus access arbiter.

13. The system of claim 11, further comprising:
means for controlling switching of said bus multiplexer from providing said communication between said first bus and said second bus bypassing said bus access arbiter to providing communication between said first bus and said second bus via said bus access arbiter; and
means for invoking a power-up reset sequence synchronized with respect to controlling said switching of said bus multiplexer.

14. The system of claim 13, further comprising:
means for monitoring for an acknowledgment that said bus multiplexer switched states in accordance with said means for controlling switching; and
means for monitoring at least one criteria associated with performance of said power-up reset sequence.

15. A system providing access to bus-mastered system resources, said system comprising:
a bus access arbiter providing bus-mastering control with respect to at least one system bus;
a first bus coupled to a plurality of system resources, said at least one system bus comprising said first bus, wherein said bus access arbiter provides arbitrated access to said plurality of system resources when providing bus-mastering of said first bus;
a second bus coupled to said bus access arbiter; and
a bus multiplexer coupled to said first bus and said second bus and operable to selectively provide communication between said first bus and said second bus bypassing control of said bus multiplexer by said bus access arbiter.

16. The system of claim 15, further comprising:
a plurality of processors coupled to said second bus, wherein said bus access arbiter provides arbitration of access to said second bus between a first and second processor of said plurality of processors, and wherein said first processor of said plurality of processors controls said first bus when said bus multiplexer provides communication between said first bus and said second bus bypassing said bus access arbiter.

17. The system of claim 16, wherein said first processor comprises:
a processor of a manageability subsystem.

18. The system of claim 16, wherein said second processor comprises:
a system processing unit.

19. The system of claim 15, further comprising:
a control signal holding said bus access arbiter in a reset state while said bus multiplexer provides communication between said first bus and said second bus bypassing said bus access arbiter.

20. The system of claim 15, further comprising:
a control signal controlling switching of said bus multiplexer from providing said communication between said first bus and said second bus bypassing said bus access arbiter to providing communication between said first bus and said second bus via said bus access arbiter; and
a control signal invoking a power-up reset sequence, wherein said bus multiplexer switching control signal and said power-up reset sequence control signal are synchronized with respect to one another.

21. The system of claim 15, wherein a system resource of said plurality of system resources is selected from the group consisting of:
a flash ROM;
a RAM;
a non-volatile RAM; and
a UART.

* * * * *

UNITED STATES PATENT AND TRADEMARK OFFICE
CERTIFICATE OF CORRECTION

| | | |
|---|---|---|
| PATENT NO. | : 7,039,736 B2 | Page 1 of 1 |
| APPLICATION NO. | : 10/342886 | |
| DATED | : May 2, 2006 | |
| INVENTOR(S) | : Paul J. Mantey et al. | |

It is certified that error appears in the above-identified patent and that said Letters Patent is hereby corrected as shown below:

In column 7, line 47, delete "PLK 310" and insert -- PLR 310 --, therefor.

In column 10, line 26, delete "12C" and insert -- I2C --, therefor,

In column 10, line 29, delete "12C" and insert -- I2C --, therefor.

Signed and Sealed this

Twenty-first Day of April, 2009

JOHN DOLL
*Acting Director of the United States Patent and Trademark Office*